(12) United States Patent
Sakaguchi

(10) Patent No.: US 11,294,410 B2
(45) Date of Patent: Apr. 5, 2022

(54) VOLTAGE REGULATOR HAVING A PHASE COMPENSATION CIRCUIT

(71) Applicant: ABLIC Inc., Chiba (JP)

(72) Inventor: Kaoru Sakaguchi, Chiba (JP)

(73) Assignee: ABLIC INC., Chiba (JP)

( * ) Notice: Subject to any disclaimer, the term of this patent is extended or adjusted under 35 U.S.C. 154(b) by 0 days.

(21) Appl. No.: 16/880,174

(22) Filed: May 21, 2020

(65) Prior Publication Data

US 2020/0379492 A1 Dec. 3, 2020

(30) Foreign Application Priority Data

May 27, 2019 (JP) .............................. JP2019-098546

(51) Int. Cl.
| | |
|---|---|
| *G05F 1/575* | (2006.01) |
| *G05F 1/59* | (2006.01) |
| *G05F 1/10* | (2006.01) |
| *H02M 3/156* | (2006.01) |
| *H02M 1/08* | (2006.01) |

(52) U.S. Cl.
CPC ............... *G05F 1/575* (2013.01); *G05F 1/59* (2013.01); *G05F 1/10* (2013.01); *H02M 1/08* (2013.01); *H02M 3/156* (2013.01)

(58) Field of Classification Search
CPC .. G05F 1/575; G05F 1/59; G05F 1/10; H02M 1/08; H02M 3/156
USPC ......................................................... 323/269
See application file for complete search history.

(56) References Cited

U.S. PATENT DOCUMENTS

| | | | | |
|---|---|---|---|---|
| 7,791,399 B2* | 9/2010 | Zhou | ........................ | G09G 3/36 |
| | | | | 327/340 |
| 10,637,344 B2* | 4/2020 | Tomioka | .................. | H02M 1/08 |
| 2005/0231180 A1* | 10/2005 | Nagata | ..................... | G05F 1/575 |
| | | | | 323/268 |
| 2008/0116862 A1* | 5/2008 | Yang | ........................ | G05F 1/575 |
| | | | | 323/269 |
| 2009/0212753 A1* | 8/2009 | Lou | ........................ | G05F 1/563 |
| | | | | 323/277 |
| 2015/0214838 A1* | 7/2015 | Tomioka | .................. | G05F 1/571 |
| | | | | 323/282 |
| 2015/0277458 A1* | 10/2015 | Suzuki | ...................... | G05F 1/56 |
| | | | | 323/280 |

FOREIGN PATENT DOCUMENTS

JP 2007-109267 A 4/2007

* cited by examiner

*Primary Examiner* — Yemane Mehari
(74) *Attorney, Agent, or Firm* — Crowell & Moring LLP

(57) ABSTRACT

A voltage regulator includes an error amplifier which controls the gate of an output transistor so that a feedback voltage based on an output voltage of an output terminal matches a first reference voltage, a first transistor having a gate to which a second reference voltage is supplied, and a first resistor connected between the gate of the output transistor and the source of the first transistor. The first resistor functions as a resistance constituting a phase compensation circuit by a current flowing therethrough in response to a small output current of the output transistor.

12 Claims, 5 Drawing Sheets

VOLTAGE REGULATOR HAVING A PHASE COMPENSATION CIRCUIT

RELATED APPLICATIONS

This application claims priority to Japanese Patent Application No. 2019-098546, filed on May 27, 2019, the entire content of which is incorporated herein by reference.

BACKGROUND OF THE INVENTION

1. Field of the Invention

The present invention relates to a voltage regulator and in particular to a phase compensation circuit of a voltage regulator having a wide dynamic range of output current.

2. Description of the Related Art

Since a voltage regulator is designed to have a larger output transistor size in order to increase output current, the gate capacitance of the output transistor increases. A capacitor having a large capacitance is also connected to the output terminal of the voltage regulator to stabilize the output voltage. Since the frequency of the pole in the phase-frequency characteristics is inversely proportional to the capacitance of the capacitor, two poles caused by these capacitances are located in a low frequency range within a band of the gain-frequency characteristics of a negative feedback loop composed of an error amplifier, the output transistor, and a voltage-dividing resistor. In such a voltage regulator, a phase compensation circuit is used to compensate the phase delay caused by the two poles.

A conventional phase compensation circuit is composed of a capacitor connected between the output terminal of the voltage regulator and a non-inverting input terminal of an error amplifier, and a resistor connected between the output terminal of a voltage-dividing resistor and the non-inverting input terminal of the error amplifier. A circuit to switch the capacitance of the capacitor and the resistance of the resistor according to the output current of the voltage regulator is used so that a phase margin in the voltage regulator having a wide dynamic range of output current can be obtained (for example, see Japanese Patent Application Laid-Open No. 2007-109267).

Recently, voltage regulators have been often designed to be low current consumption to reduce battery power consumption. The lower the current consumption becomes, the larger the output resistance of an error amplifier becomes. Since pole frequency in the phase frequency characteristics is inversely proportional to the resistance, the pole generated at the gate of the output transistor controlled by the error amplifier has a lower frequency. The load device may also have an operation mode with low current consumption, which decrease the output current, reducing the frequency of the pole at the output terminal of the voltage regulator even lower.

However, in the above-described phase compensation circuit, since the zero frequency which performs phase compensation is determined by the capacitance of a capacitor and the resistance of a resistor, the capacitance and the resistance should be increased in a feedback system having low-frequency poles, which increases the area of the phase compensation circuit and hence increases the chip size, resulting in an increase in cost.

SUMMARY OF THE INVENTION

It is an object of the present invention to provide a voltage regulator having a wide dynamic range of output current without increasing the cost.

A voltage regulator according to one aspect of the present invention includes: an error amplifier which controls the gate of an output transistor so that a feedback voltage based on an output voltage of an output terminal matches a first reference voltage; a first transistor having a gate to which a second reference voltage is supplied; and a first resistor connected between the gate of the output transistor and the source of the first transistor, and configured to function as a resistance constituting a phase compensation circuit by a current flowing through the first resistor in response to a small output current of the output transistor.

A voltage regulator according to another aspect of the present invention includes: an error amplifier which controls the gate of an output transistor so that a feedback voltage based on an output voltage of an output terminal matches a first reference voltage; a first transistor having a drain connected to the gate of the output transistor and having a gate to which a second reference voltage is supplied; a second transistor having a source connected to an input terminal and having a gate connected to the gate of the output transistor; a third transistor having a drain and a gate connected to the drain of the second transistor and having a source connected to a ground terminal; and a first resistor connected between the source of the first transistor and the drain of the third transistor and configured to function as a resistance constituting a phase compensation circuit by a current flowing through the first resistor in response to a small output current of the output transistor.

According to the voltage regulators of the present invention, since a resistor for phase compensation through which a current flows when the output current of the output terminal is small is provided to function as a resistance constituting a phase compensation circuit, a large phase margin can be kept in a voltage regulator having a wide dynamic range while the circuit area of a phase compensation circuit is small.

DETAILED DESCRIPTION OF THE PREFERRED EMBODIMENTS

Voltage regulators of the present invention will be described below with reference to the accompanying drawings.

First Embodiment

Figure 1:
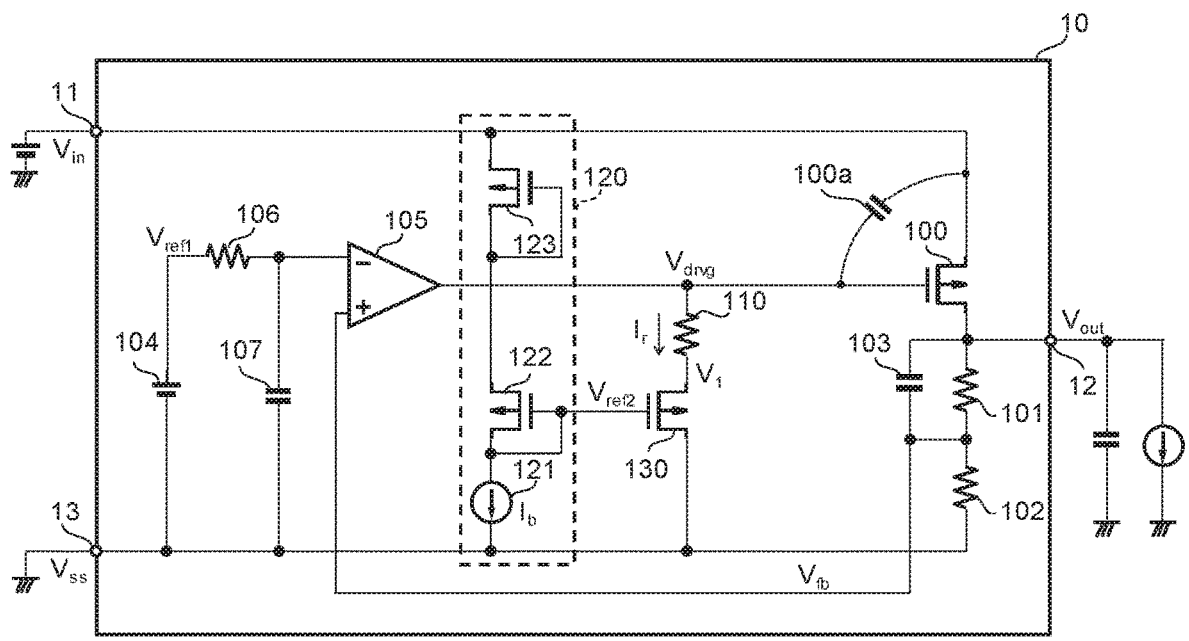
FIG. 1 is a circuit diagram illustrating a voltage regulator according to a first embodiment of the present invention.

FIG. 1 is a circuit diagram illustrating a voltage regulator according to the first embodiment.

A voltage regulator 10 includes an input terminal 11, an output terminal 12, a ground terminal 13, a PMOS transistor 100 which is an output transistor, resistors 101, 102 which constitute a feedback circuit, a phase compensation capacitor 103, a reference voltage circuit 104 which is a first reference voltage circuit, an error amplifier 105, a resistor 106, a capacitor 107, a resistor 110 for phase compensation, a reference voltage circuit 120 which is a second reference voltage circuit, and a PMOS transistor 130 which is a first transistor. The reference voltage circuit 120 has a current source 121 and PMOS transistors 122, 123. The reference voltage circuit 120, the PMOS transistor 130, the resistor 110, and the capacitor 103 constitute a phase compensation circuit.

In the voltage regulator 10, an external power supply is connected to the input terminal 11, an output capacitor and a load are connected to the output terminal 12, and the ground terminal 13 is grounded.

A capacitor 100a schematically represents a parasitic capacitance between the gate and the source of the PMOS transistor 100 and is not an element existing independently from the PMOS transistor 100. The capacitance between the gate and drain of the PMOS transistor 100, which cannot be ignored, is omitted to simplify the description.

The connection of each component in the voltage regulator 10 will be described.

The PMOS transistor 100 has the source which is connected to the input terminal 11, the gate which is connected to an output terminal of the error amplifier 105, and the drain which is connected to the output terminal 12. The resistor 101 and the resistor 102 are connected in series between the output terminal 12 and the ground terminal 13 to form a feedback circuit. The connection point of the resistor 101 and the resistor 102 (an output terminal of the feedback circuit) is connected to a non-inverting input terminal of the error amplifier 105. The phase compensation capacitor 103 is connected in parallel with the resistor 101. The output terminal of the reference voltage circuit 104 is connected to an inverting input terminal of the error amplifier 105 through the resistor 106. The capacitor 107 is connected between the inverting input terminal of the error amplifier 105 and the ground terminal 13. The resistor 110 is connected between the gate of the PMOS transistor 100 and the source of the PMOS transistor 130. The PMOS transistor 130 has the gate which is connected to the output terminal of the reference voltage circuit 120 and the drain which is connected to the ground terminal 13.

The current source 121 has one terminal which is connected to the ground terminal 13, and the other terminal which is connected to the drain and gate of the PMOS transistor 122 and to the output terminal of the reference voltage circuit 120. The PMOS transistor 123 has the source which is connected to the input terminal 11 and the gate and drain which are connected to the source of the PMOS transistor 122.

The operation of the voltage regulator 10 having the above-described structure will be described below.

The reference voltage circuit 104 provides a reference voltage $V_{ref1}$ as the first reference voltage based on the voltage $V_{ss}$ of the ground terminal 13 through a low-pass filter composed of the resistor 106 and the capacitor 107. The feedback circuit provides, from the output terminal thereof, a feedback voltage $V_{fb}$ based on the output voltage $V_{out}$ of the output terminal 12.

Given a voltage $V_{in}$ to the input terminal 11, the error amplifier 105 controls the gate voltage $V_{drvg}$ of the output transistor 100 so that the feedback voltage $V_{fb}$ matches the reference voltage $V_{ref1}$. The voltage regulator 10 thereby provides the constant output voltage $V_{out}$ to the output terminal 12 regardless of the voltage $V_{in}$.

Next, phase compensation in the voltage regulator 10 will be described.

The reference voltage circuit 120 provides a reference voltage $V_{ref2}$ as the second reference voltage based on the voltage $V_{in}$. The difference between the reference voltage $V_{ref2}$ and the voltage $V_{in}$ is set larger than the sum of the absolute value of the threshold voltage $V_{th100}$ of the PMOS transistor 100 and the absolute value of the threshold voltage $V_{th130}$ of the PMOS transistor 130. Such setting of the reference voltage $V_{ref2}$ causes the resistor 110 to function as a resistance constituting a phase compensation circuit in response to a small current flowing through the load.

The reference voltage circuit 120 provides the reference voltage $V_{ref2}$ obtained by subtracting the sum of gate-source voltages of the PMOS transistor 122 and the PMOS transistor 123 from the voltage $V_{in}$. In an operation of the PMOS transistors 122, 123 in a strong inversion region, the reference voltage $V_{ref2}$ is expressed by Equation 1:

$$V_{ref2} = V_{in} - |V_{th122}| - \sqrt{\frac{K_{122}}{I_b}} - |V_{th123}| - \sqrt{\frac{K_{123}}{I_b}}. \quad (1)$$

Here, $V_{th122}$ denotes the threshold voltage of the PMOS transistor 122, $V_{th123}$ denotes the threshold voltage of the PMOS transistor 123, $K_{122}$ denotes the K value of the PMOS transistor 122, and $K_{123}$ denotes the K value of the PMOS transistor 123. From Equation 1, the reference voltage $V_{ref2}$ can satisfy the above-described condition by setting the sum of the absolute value of the threshold voltage $V_{th122}$ and the absolute value of the threshold voltage $V_{th123}$ larger than or equal to the sum of the absolute value of the threshold voltage $V_{th100}$ and the absolute value of the threshold voltage $V_{th130}$.

In order to reduce variation in the value of the output current $I_{out}$ which flows through the PMOS transistor 100 and which causes a current flow through the resistor 110, it is desired to set one of the threshold voltages of the PMOS transistors 122, 123 equal to one of the threshold voltages of the PMOS transistor 100 and the PMOS transistor 130. It is also desired to set the other one of the threshold voltages of the PMOS transistors 122, 123 equal to the other one of the threshold voltages of the PMOS transistor 100 and the PMOS transistor 130.

Although the reference voltage $V_{ref2}$ for the PMOS transistors 122, 123 operating in the strong inversion region is expressed in Equation 1 as an example, it is not necessarily required to operate the PMOS transistors 122, 123 in the strong inversion region as long as the above-described condition is maintained.

When the current flowing through the load is small, that is, when the output current $I_{out}$ flowing through the PMOS transistor 100 is small, the gate voltage $V_{drvg}$ of the PMOS transistor 100 rises close to the threshold voltage $V_{th100}$. The PMOS transistor 130 hence turns on because the difference between the voltage $V_1$ at the source terminal and the reference voltage $V_{ref2}$ approaches the threshold voltage $V_{th300}$. Since the difference between the reference voltage $V_{ref2}$ and the voltage $V_{in}$ is larger than the sum of the absolute value of the threshold voltage $V_{th100}$ and the absolute value of the threshold voltage $V_{th130}$, voltage is generated across the resistor 110 and hence current $I_r$ flows.

The current $I_r$ is given by Equation 2 in which the resistance of the resistor 110 is denoted by $R_{110}$.

$$I_r = \frac{V_{drvg} - V_1}{R_{110}} \quad (2)$$

The current $I_r$ flows from the gate of the PMOS transistor 100 into the ground terminal 13 through the PMOS transistor 130. The resistor 110 thus functions as a resistance constituting a phase compensation circuit.

The pole frequency $f_{p1}$ at the output terminal 12 is expressed by Equation 3 in which a combined resistance of the drain resistance of the output transistor 100, the resistors 101, 102, and a resistance component of the load is denoted by $R_{out}$, and the capacitance of the output capacitor is denoted by $C_{out}$.

$$f_{p1} = \frac{1}{2\pi R_{out} C_{out}} \quad (3)$$

The pole frequency $f_{p2}$ at the gate of the output transistor 100 is expressed by Equation 4 under the condition that the resistance $R_{110}$ of the resistor 110 is set sufficiently small with respect to the output resistance $R_{eo}$ of the error amplifier 105.

$$f_{p2} = \frac{1}{2\pi R_{110} C_{100a}} \quad (4)$$

Here, it is assumed that the capacitance of elements and wiring lines connected to the gate of the output transistor 100 is sufficiently small with respect to gate capacitance $C_{100a}$. Since the output resistance $R_{eo}$ of the error amplifier 105 designed to be low current consumption naturally increases, a relation $R_{eo} > R_{110}$ easily holds.

A zero frequency $f_z$ generated in the feedback circuit is expressed by Equation 5 using the resistance $R_{101}$ of the resistor 101 and the capacitance $C_{103}$ of the phase compensation capacitor 103.

$$f_z = \frac{1}{2\pi R_{101} C_{103}} \quad (5)$$

Since small output current $I_{out}$ increases the resistance $R_{out}$, the pole frequency $f_{p1}$ at the output terminal 12 reduces and $f_{p1} < f_{p2}$ holds. The pole frequency $f_{p1}$ becomes a dominant pole and the pole frequency $f_{p2}$ becomes a non-dominant pole. In the phase compensation design, it is important to increase the frequency difference between the dominant pole and the non-dominant pole, and to bring the frequency of the non-dominant pole close to the frequency at zero in order to secure a phase margin.

In the voltage regulator 10 the pole frequency $f_{p2}$ can be increased by decreasing the resistance $R_{110}$ according to Equation 4. This eliminates a need to increase the capacitance $C_{103}$ in order to decrease the zero frequency $f_z$. In other words, the phase margin can be secured without increasing the area of the capacitor 103. Even with a large capacitance $C_{out}$, since the relation between the pole frequency $f_{p1}$ and the pole frequency $f_{p2}$, and the relation between the pole frequency $f_{p2}$ and the zero frequency $f_z$ do not change, it is possible to secure the phase margin.

For a large current flowing through the load, that is, for a large output current $I_{out}$ flowing through the PMOS transistor 100, the gate voltage $V_{drvg}$ of the PMOS transistor 100 drops. The gate-source voltage becomes small and the PMOS transistor 130 then turns off because the gate voltage is kept constant at the reference voltage $V_{ref2}$. Since there is no voltage difference across the resistor 110, the current $I_r$ becomes zero and hence the resistor 110 does not function as a resistance constituting the phase compensation circuit.

The pole frequency $f_{p2}$ at the gate of the output transistor 100 is expressed by Equation 6.

$$f_{p2} = \frac{1}{2\pi R_{eo} C_{100a}} \quad (6)$$

Since the resistance $R_{eo}$ is larger than the resistance $R_{110}$, the pole frequency $f_{p2}$ becomes lower than the value obtained from Equation 4.

Like in the case of a small output current $I_{out}$, the zero frequency $f_z$ is expressed by Equation 5. Similarly, the pole frequency $f_{p1}$ is expressed by Equation 3, but since the resistance $R_{out}$ is small, the pole frequency $f_{p1}$ at the output terminal 12 becomes high. Since the relation $f_{p1} > f_{p2}$ is established, the pole frequency $f_{p2}$ becomes the dominant pole and the pole frequency $f_{p1}$ becomes the non-dominant pole. Since the frequency difference between the dominant pole and the non-dominant pole is large, phase compensation can be performed easily.

In the case of the large output current $I_{out}$, since no current flows through the resistor 110, only the capacitor 103 is effective in the phase compensation circuit in the same way as the conventional phase compensation circuit.

In order to reduce variation in the relationship between the pole frequency $f_{p2}$ and the zero frequency $f_z$ for phase compensation in the case of the small output current $I_{out}$, it is preferred that resistor elements having the same structure and same temperature characteristics are used as the resistor 101 and the resistor 110 so that variations of the resistance $R_{101}$ and the resistance $R_{110}$ will show similar tendencies. It is also preferred that an insulating film that forms the capacitor 103 is formed in the same process as the gate insulating film of the PMOS transistor so that the change of the capacitance $C_{100a}$ and the change of the capacitance $C_{103}$ show similar tendencies. In a general integrated circuit manufacturing process, these preferences can be achieved without additional cost.

As described above, according to the voltage regulator 10, the voltage regulator capable of securing a phase margin regardless of the magnitude of the output current $I_{out}$ and regardless of the magnitude of the capacitance $C_{out}$ of the output capacitor can be provided without increasing the costs.

Figure 2:
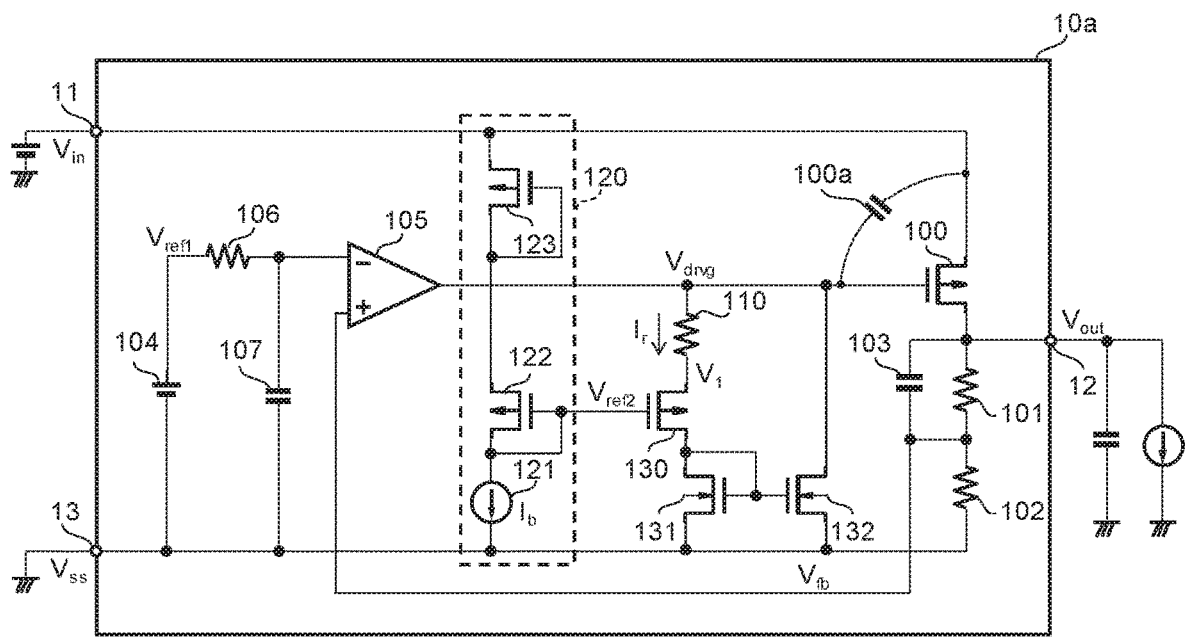
FIG. 2 is a circuit diagram illustrating another example of a voltage regulator according to the first embodiment.

FIG. 2 is a circuit diagram illustrating another example of the voltage regulator of the first embodiment.

In a voltage regulator 10a of FIG. 2, a current mirror circuit composed of NMOS transistors 131, 132 is added to the voltage regulator 10 of FIG. 1. The same reference number is given to each component identical to that in the voltage regulator 10 of FIG. 1 to omit redundant description as appropriate.

The NMOS transistor 131 has a source connected to the ground terminal 13, and a drain and a gate which are connected to the drain of the PMOS transistor 130 and the gate of the NMOS transistor 132. The NMOS transistor 132 has a source which is connected to the ground terminal 13 and a drain which is connected to the gate of the output transistor 100.

In the voltage regulator 10a having the above-described structure, at current proportional to the current IT flowing through the resistor 110 can be supplied to the gate of the output transistor 100 through the current mirror circuit. In other words, the current mirror circuit can increase the current $I_r$ equivalently. The pole frequency $f_{p2}$ for small output current $I_{out}$ is expressed by Equation 7 where the current gain of the current mirror circuit is denoted by M.

$$f_{p2} = \frac{1+M}{2\pi R_{110} C_{100a}} \quad (7)$$

It is found from Equation 7 that in the voltage regulator 10a the pole frequency $f_{p2}$ can be increased by the current mirror circuit. If the addition of two NMOS transistors can make the occupied area smaller than a structure in which the resistor 110 is composed of a plurality of resistors connected in parallel to adjust the resistance $R_{110}$ to a small value, the semiconductor device can be constructed with a smaller area.

As described above, the voltage regulator 10, 10a includes the reference voltage circuit 120 which provides the reference voltage $V_{ref2}$, the PMOS transistor 130 with the reference voltage $V_{ref2}$ supplied to the gate thereof, and the resistor 110 for phase compensation provided between the gate of the PMOS transistor 100 and the PMOS transistor 130. In the voltage regulator 10, 10a, since the resistor 110 functions as the resistance constituting the phase compensation circuit only in the case where the output current $I_{out}$ is small, the phase margin can be secured even though the area of the phase compensation circuit is small.

In the voltage regulator 10, 10a described above, since the resistor 110 for phase compensation is provided between the output terminal of the error amplifier 105 and the ground terminal, a phenomenon to be described below occurs.

Since the error amplifier 105 is not an ideal circuit, an offset voltage dependent on the current $I_r$ is generated between the inverting input terminal and the non-inverting input terminal due to the output of the current $I_r$ from the output terminal, and hence the voltage at the inverting input terminal becomes lower than the voltage at the non-inverting input terminal. The feedback voltage $V_{fb}$ rises by this offset voltage and the output voltage $V_{out}$ becomes higher than the predetermined voltage.

Figure 3:
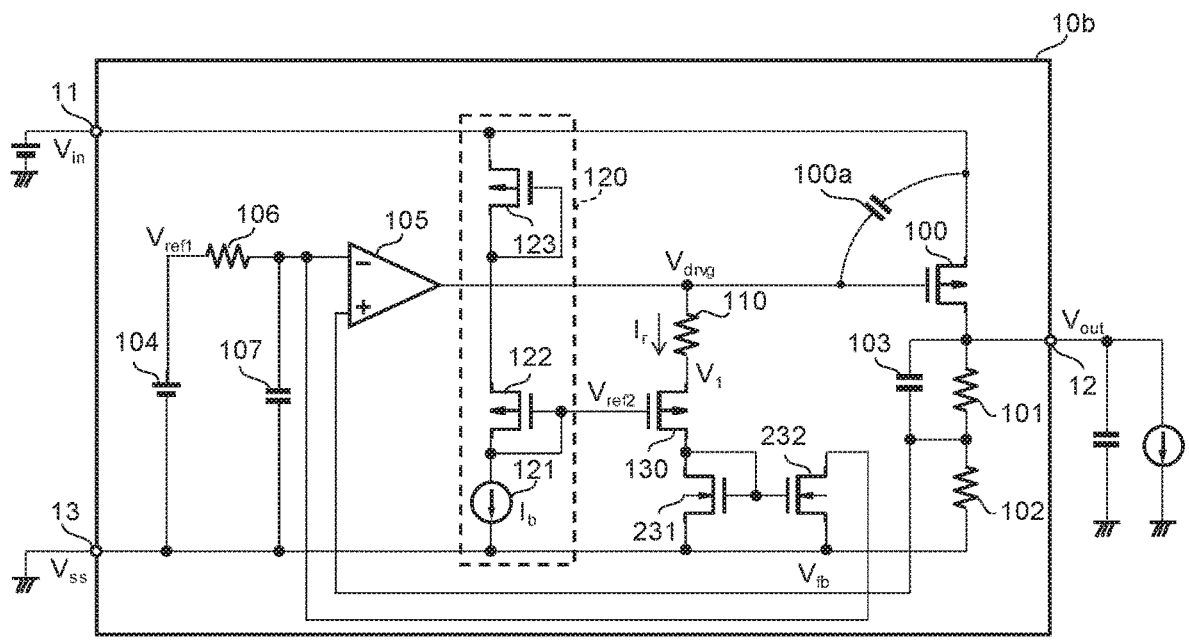
FIG. 3 is a circuit diagram illustrating still another example of a voltage regulator according to the first embodiment.
Figure 4:
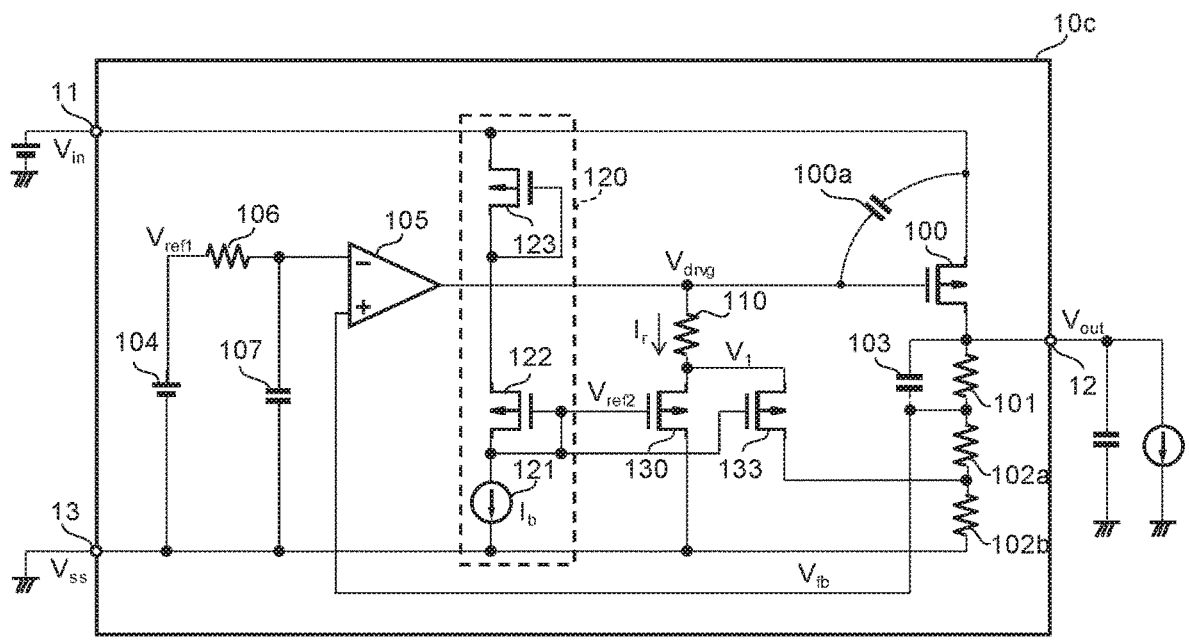
FIG. 4 is a circuit diagram illustrating yet another example of a voltage regulator according to the first embodiment.

Circuits adapted to cope with this phenomenon in the voltage regulator of FIG. 1 are illustrated in FIG. 3 and FIG. 4.

In a voltage regulator 10b of FIG. 3, a current mirror circuit composed of NMOS transistors 231, 232 to provide current to the inverting input terminal of the error amplifier 105 is added to the voltage regulator 10 of FIG. 1. Since other components are the same as those in the voltage regulator 10 of FIG. 1, the same reference numbers are given to omit redundant description as appropriate.

In the voltage regulator 10b, a current proportional to the current $I_r$ flowing through the resistor 110 is supplied to the inverting input terminal of the error amplifier 105 through the current mirror circuit. Since the current proportional to the current $I_r$ flows, a voltage is generated across the resistor 106, permitting cancellation of the contribution of the offset voltage and accurate matching of the reference voltage $V_{ref1}$ with the feedback voltage $V_{fb}$.

In order to cancel the offset voltage of the error amplifier 105 accurately, it is preferred that resistor elements having the same structure and same temperature characteristics are used as the resistor 101 and the resistor 106.

According to the voltage regulator 10b of FIG. 3, the accuracy of the output voltage can be increased by canceling the offset voltage generated by the current flowing through the resistor 110 to reduce the dependence of the output voltage on the output current $I_{out}$ in addition to keeping the phase margin high across a wide variety of load conditions without increasing the costs.

In a voltage regulator 10c of FIG. 4, a PMOS transistor 133 is added to the voltage regulator 10 of FIG. 1, and the resistor 102 included in the feedback circuit is divided into a resistor 102a and a resistor 102b. The same reference number is given to each component identical to that in the voltage regulator 10 of FIG. 1 to omit redundant description as appropriate.

The PMOS transistor 133 has a source which is connected to the source of the PMOS transistor 130, a gate which is connected to the gate of the PMOS transistor 130, and a drain which is connected to the connection point of the resistor 102a and the resistor 102b.

In the voltage regulator 10c having the above-described structure, the current $I_r$ flowing through the resistor 110 is divided to flow into the PMOS transistor 130 and the PMOS transistor 133. The current flowing through the PMOS transistor 133 flows into the ground terminal 13 through the resistor 102b. Since the current based on $I_r$ flows through the resistor 102b, an apparent resistance of the resistor 102b can be adjusted to decrease the output voltage $V_{out}$, leading to cancellation of the contribution of the offset voltage.

In order to cancel the offset voltage of the error amplifier 105 accurately, it is preferred that resistor elements having the same structure and same temperature characteristics are used as the resistor 110 and the resistor 102b.

According to the voltage regulator 10c of FIG. 4, the accuracy of the output voltage can be increased by canceling the offset voltage generated by the current flowing through the resistor 110 to reduce the dependence of the output voltage on the output current $I_{out}$ in addition to keeping the phase margin high across a wide variety of load conditions without increasing the costs.

Although the voltage regulator 10c is constructed by dividing the resistor 102 into the resistor 102a and the resistor 102b, the current form the PMOS transistor 133 may also be provided to flow through the undivided resistor 102.

Second Embodiment

Figure 5:
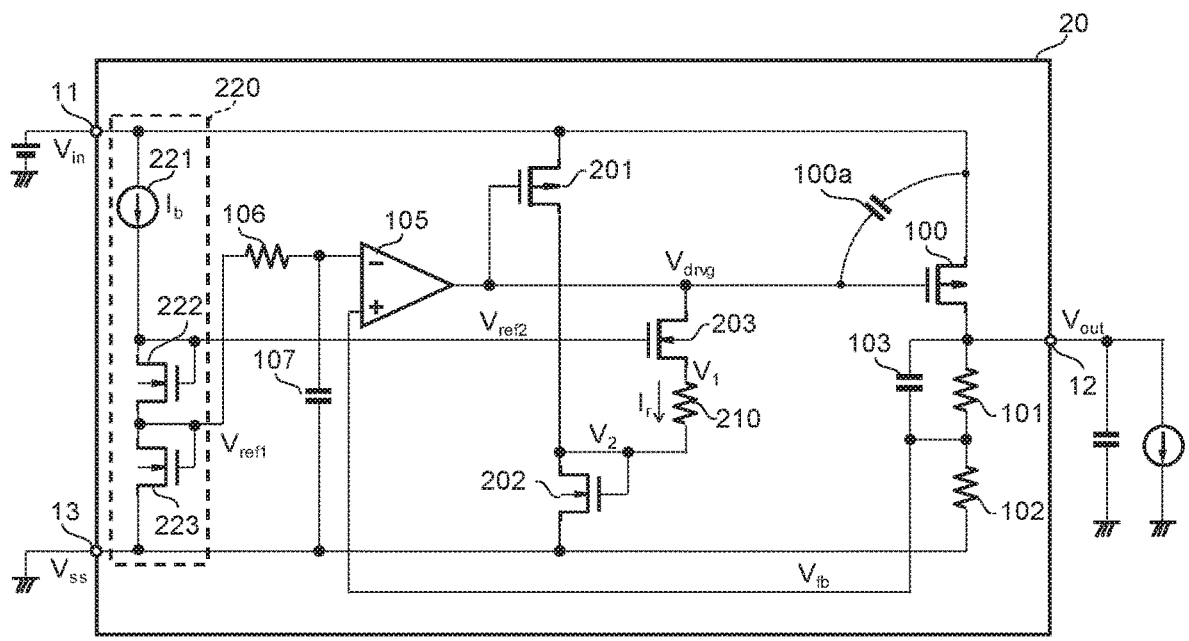
FIG. 5 is a circuit diagram illustrating a voltage regulator according to a second embodiment of the present invention.

FIG. 5 is a circuit diagram illustrating a voltage regulator according to the second embodiment.

A voltage regulator 20 is constructed such that the reference voltage circuits 104, 120 in the voltage regulator 10 of FIG. 1 are replaced with a reference voltage circuit 220, and the elements that constitute the phase compensation circuit in the voltage regulator 10 of FIG. 1 are replaced with a PMOS transistor 201, NMOS transistors 202, 203, and a resistor 210. The reference voltage circuit 220 includes a current source 221 and NMOS transistors 222, 223. The same reference number is given to each component identical to that in the voltage regulator 10 of FIG. 1 to omit redundant description as appropriate.

The PMOS transistor 201 has a gate which is connected to the gate of the PMOS transistor 100, a source which is connected to the input terminal 11, and a drain which is connected to the gate and drain of the NMOS transistor 202, and to one terminal of the resistor 210. The source of the NMOS transistor 202 is connected to the ground terminal 13. The other terminal of the resistor 210 is connected to the source of the NMOS transistor 203. The NMOS transistor 203 has a drain which is connected to the gate of the PMOS transistor 100 and a gate which is connected to the second output terminal of the reference voltage circuit 220. The first output terminal of the reference voltage circuit 200 is connected to the inverting input terminal of the error amplifier 105 through the resistor 106.

The current source 221 has one terminal which is connected to the input terminal 11, and the other terminal which is connected to the drain and gate of the NMOS transistor 222 and to the second output terminal of the reference voltage circuit 220. The NMOS transistor 223 has a source which is connected to the ground terminal 13, and a gate and a drain which are connected to the source of the NMOS transistor 222 and to the first output terminal of the reference voltage circuit 220.

The reference voltage circuit 220 provides, from the first output terminal, the reference voltage $V_{ref1}$ based on the voltage $V_{ss}$, and provides, from the second output terminal, the reference voltage $V_{ref2}$ based on the voltage $V_{ss}$.

Next, phase compensation of the voltage regulator 20 will be described.

The reference voltage $V_{ref2}$ is set larger than the sum of a threshold voltage $V_{th202}$ of the NMOS transistor 202 and a threshold voltage $V_{th203}$ of the NMOS transistor 203. By setting the reference voltage $V_{ref2}$ as described above, the resistor 210 functions as a resistance constituting the phase compensation circuit in the case where the current flowing through the load is small.

The reference voltage circuit 220 constructed as described above provides the reference voltage $V_{ref2}$ obtained by adding respective gate-source voltages of the NMOS transistors 222, 223 to the voltage $V_{ss}$. In the operation of the NMOS transistors 222, 223 in the strong inversion region, the reference voltage $V_{ref2}$ is expressed in Equation 8.

$$V_{ref2} = V_{SS} + V_{th222} + \sqrt{K}\, V_{th223_{th123}} + \sqrt{\frac{K_{223}}{I_b}} \qquad (8)$$

Here, $V_{th222}$ denotes the threshold voltage of the NMOS transistor 222, $V_{th223}$ denotes the threshold voltage of the NMOS transistor 223, $K_{222}$ denotes the K value of the NMOS transistor 222, and $K_{223}$ denotes the K value of the NMOS transistor 223. From Equation 8, the reference voltage $V_{ref2}$ can satisfy the above-described condition by setting the sum of the threshold voltage $V_{th222}$ and the threshold voltage $V_{th223}$ larger than or equal to the sum of the threshold voltage $V_{th202}$ and the threshold voltage $V_{th203}$.

In order to reduce variation in the value of output current $I_{out}$ capable of flowing current through the resistor 210, it is desired to set one of the threshold voltages of the NMOS transistors 222, 223 equal to one of the threshold voltages of the NMOS transistor 202 and the NMOS transistor 203. It is also desired to set the other of the threshold voltages of the NMOS transistors 222, 223 equal to the other of the threshold voltages of the NMOS transistor 202 and the NMOS transistor 203.

Although the reference voltage $V_{ref2}$ expressed by Equation 8 is an example of the case where the NMOS transistors 222, 223 are operating in the strong inversion region, operation of the NMOS transistors 222, 223 in the strong inversion region is not necessarily required as long as the above-described condition is maintained.

The PMOS transistor 201 provides a sense current proportional to the output current $I_{out}$ supplied from the PMOS transistor 100. Flow of the sense current causes the NMOS transistor 202 to generates, at the gate thereof, a voltage $V_2$ dependent on the output current $I_{out}$.

For a small output current $I_{out}$, the sense current provided by the PMOS transistor 201 is small, and the gate-source voltage of the NMOS transistor 202 decreases and approaches the threshold voltage $V_{th202}$. In this case, since the NMOS transistor 203 turns on, the difference between the voltage $V_1$ and the reference voltage $V_{ref2}$ approaches the threshold voltage $V_{th203}$. Since the reference voltage $V_{ref2}$ is larger than the sum of the threshold voltage $V_{th201}$ and the threshold voltage $V_{th203}$, a voltage difference is generated across the resistor 210 and hence the current $I_r$ flows. The current $I_r$ is given by Equation 9 where the resistance of the resistor 210 is denoted by $R_{210}$.

$$I_r = \frac{V_1 - V_2}{R_{210}} \qquad (9)$$

The current $I_r$ flows from the gate of the PMOS transistor 100 into the ground terminal 13 through the NMOS transistor 203. The resistor 210 thus functions as a resistance constituting the phase compensation circuit.

For a large output current $I_{out}$, the sense current provided by the PMOS transistor 201 becomes large. The gate-source voltage of the NMOS transistor 202 thereby becomes large and hence the gate voltage $V_2$ rises. The NMOS transistor 203 turns off because the gate voltage is kept constant at the reference voltage $V_{ref2}$ and the gate-source voltage becomes small. Since no voltage difference occurs across the resistor 210, the current $I_r$ becomes zero and hence the resistor 210 does not function as a resistance constituting the phase compensation circuit.

Since phase compensation of the voltage regulator according to the second embodiment is the same as that of the voltage regulator of FIG. 1, the detailed description thereof will be omitted.

As described above, the voltage regulator according to the second embodiment includes the reference voltage circuit 220 which provides the reference voltage $V_{ref2}$, the NMOS transistor 203 with the reference voltage $V_{ref2}$ supplied to the gate thereof, and the resistor 210 for phase compensation provided between the NMOS transistor 203 and the NMOS transistor 202 through which the sense current flows. In the voltage regulator according to the second embodiment, since the resistor 210 functions as a resistance constituting the phase compensation circuit only in the case where the output current $I_{out}$ is small, the phase margin can be secured even though the area of the phase compensation circuit is small.

Further, since the voltage regulator according to the second embodiment is constructed from one reference voltage circuit 220, compared with the first embodiment constructed from two reference voltage circuits, the circuit area can be reduced to reduce the costs.

While the present invention has been described based on the embodiments, the present invention is not limited to the aforementioned embodiments. It is needless to say that various changes can be made without departing from the gist of the present invention. For example, even in the voltage regulator of the second embodiment, a circuit for canceling offset may be added as in the voltage regulator of the first embodiment.

What is claimed is:

1. A voltage regulator comprising:
   an output transistor having a source connected to an input terminal and having a drain connected to an output terminal;
   an error amplifier configured to control a gate of the output transistor so that a feedback voltage based on an output voltage of the output terminal matches a first reference voltage;
   a first transistor having a gate to which a second reference voltage is supplied; and
   a first resistor connected between the gate of the output transistor and a source of the first transistor, and configured to function as a resistance constituting a phase compensation circuit by a current flowing through the first resistor in response to a small output current of the output transistor.

2. The voltage regulator according to claim 1, wherein the second reference voltage is based on a voltage at the input terminal larger than or equal to a sum of an absolute value of a threshold voltage of the output transistor and an absolute value of a threshold voltage of the first transistor.

3. A voltage regulator comprising:
   an output transistor having a source connected to an input terminal and a drain connected to an output terminal;
   an error amplifier configured to control a gate of the output transistor so that a feedback voltage based on an output voltage of the output terminal matches a first reference voltage;
   a first transistor having a drain connected to the gate of the output transistor and having a gate to which a second reference voltage is supplied;
   a second transistor having a source connected to the input terminal and having a gate connected to the gate of the output transistor;
   a third transistor having a drain and a gate connected to a drain of the second transistor and having a source connected to a ground terminal; and
   a first resistor connected between a source of the first transistor and the drain of the third transistor, and configured to function as a resistance constituting a phase compensation circuit by a current flowing through the first resistor in response to a small output current of the output transistor.

4. The voltage regulator according to claim 3, wherein the second reference voltage is based on a voltage at the ground terminal larger than or equal to a sum of a threshold voltage of the first transistor and a threshold voltage of the third transistor.

5. The voltage regulator according to claim 3, further comprising:
   a current source connected to the input terminal;
   a fourth transistor having a gate and a drain connected to the current source; and
   a fifth transistor having a gate and a drain connected to a source of the fourth transistor and having a source connected to the ground terminal,
   wherein the first reference voltage is supplied from the drain of the fifth transistor, and the second reference voltage is supplied from the drain of the fourth transistor.

6. The voltage regulator according to claim 4, further comprising:
   a current source connected to the input terminal;
   a fourth transistor having a gate and a drain connected to the current source; and
   a fifth transistor having a gate and a drain connected to a source of the fourth transistor and having a source connected to the ground terminal,
   wherein the first reference voltage is supplied from the drain of the fifth transistor, and the second reference voltage is supplied from the drain of the fourth transistor.

7. The voltage regulator according to claim 1, further comprising:
   a first current mirror circuit configured to provide a current proportional to a current flowing from the gate of the output transistor into the first resistor.

8. The voltage regulator according to claim 1, further comprising:
   a second resistor having one end connected to an output terminal of a first reference voltage circuit configured to output the first reference voltage, and having another end connected to an input terminal of the error amplifier; and
   a second current mirror circuit configured to provide, to the other end of the second resistor, a current proportional to the current flowing through the first resistor.

9. The voltage regulator according to claim 1, further comprising:
   a sixth transistor configured to provide a current proportional to the current flowing through the first resistor to a divided resistor provided between the output terminal and the ground terminal to provide the feedback voltage.

10. The voltage regulator according to claim 3, further comprising:
    a first current mirror circuit configured to provide a current proportional to a current flowing from the gate of the output transistor into the first resistor.

11. The voltage regulator according to claim 3, further comprising:
    a second resistor having one end connected to an output terminal of a first reference voltage circuit configured to output the first reference voltage, and having another end connected to an input terminal of the error amplifier; and
    a second current mirror circuit configured to provide, to the other end of the second resistor, a current proportional to the current flowing through the first resistor.

12. The voltage regulator according to claim 3 further comprising:
    a sixth transistor configured to provide a current proportional to the current flowing through the first resistor to a divided resistor provided between the output terminal and the ground terminal to provide the feedback voltage.

* * * * *